US 6,655,191 B2

(12) United States Patent
Hohner et al.

(10) Patent No.: US 6,655,191 B2
(45) Date of Patent: Dec. 2, 2003

(54) METHOD FOR DETECTING KNOCKING COMBUSTION IN THE OPERATION OF AN INTERNAL COMBUSTION ENGINE

(75) Inventors: Peter Hohner, Leinfelden-Echterdingen (DE); Klaus Knolmayer, Schwabach (DE); Joerg Miroll, Koengen (DE); Linhard Niemetz, Rednitzhembach (DE)

(73) Assignees: DaimlerChrysler AG, Stuttgart (DE); Temic Telefunken microelectronic GmbH, Nuremburg (DE)

( * ) Notice: Subject to any disclaimer, the term of this patent is extended or adjusted under 35 U.S.C. 154(b) by 0 days.

(21) Appl. No.: 09/892,415

(22) Filed: Jun. 27, 2001

(65) Prior Publication Data

US 2002/0014108 A1 Feb. 7, 2002

(30) Foreign Application Priority Data

Jul. 5, 2000 (DE) .......................... 100 32 702

(51) Int. Cl.$^7$ .............................................. G01L 23/22
(52) U.S. Cl. .................................... 73/35.08; 73/35.04
(58) Field of Search ........................ 73/35.01, 35.03, 73/35.04, 35.05, 35.06, 35.08; 123/435, 416, 425

(56) References Cited

U.S. PATENT DOCUMENTS

| 4,232,545 A | 11/1980 | Dobler et al. |
| 4,463,729 A | 8/1984 | Bullis et al. |
| 4,565,087 A | 1/1986 | Damson et al. |
| 4,608,855 A | 9/1986 | Blauhut |
| 5,396,176 A | 3/1995 | Ishii et al. |
| 5,694,900 A | 12/1997 | Morita et al. |
| 5,785,020 A | 7/1998 | Takahashi et al. |
| 5,900,536 A | 5/1999 | Mogi et al. |
| 5,992,386 A | 11/1999 | Nytomt et al. |
| 6,155,241 A | 12/2000 | Hohner et al. |
| 6,213,092 B1 * | 4/2001 | Hohner et al. ............. 73/35.08 |
| 6,230,546 B1 | 5/2001 | Wilstermann et al. |
| 6,338,267 B1 * | 1/2002 | Karau ....................... 73/35.03 |

FOREIGN PATENT DOCUMENTS

| DE | 3327766 | 2/1985 |
| DE | 4232845 | 4/1993 |
| DE | 19645572 | 1/1998 |
| DE | 19681269 | 2/1998 |
| DE | 19810523 | 9/1998 |
| DE | 19720535 | 11/1998 |
| DE | 19826714 | 12/1998 |
| DE | 19720532 | 1/1999 |
| DE | 19755257 | 6/1999 |
| EP | 0922948 | 6/1999 |
| EP | 0950885 | 10/1999 |
| WO | WO89/11087 | 11/1989 |

* cited by examiner

Primary Examiner—Helen Kwok
(74) Attorney, Agent, or Firm—W. F. Fasse; W. G. Fasse

(57) ABSTRACT

In a method for detecting knocking combustion during the operation of an internal combustion engine with a device for measuring the ionic current, the raw ionic current signal or the evaluated value of the knocking intensity are normalized. This enables the value of the knocking intensity to be reliably compared with a threshold value. The normalization avoids the falsifying influence of large intensity fluctuations of the raw ionic current signal from one combustion cycle to the next without any relation to the true knocking intensity.

30 Claims, 10 Drawing Sheets

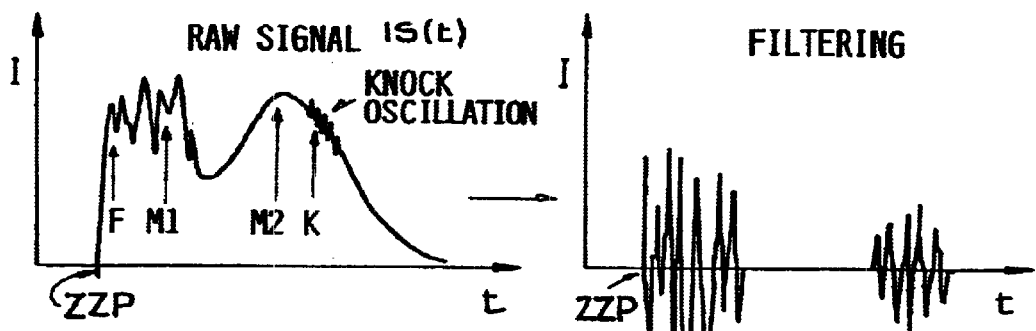
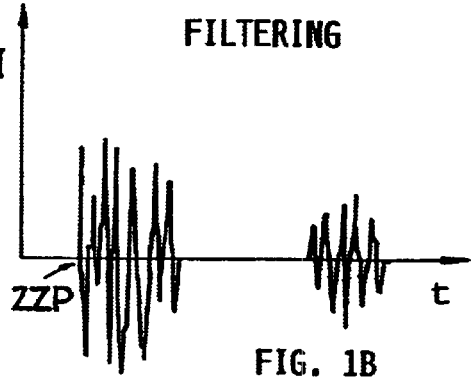
FIG. 1A  FIG. 1B
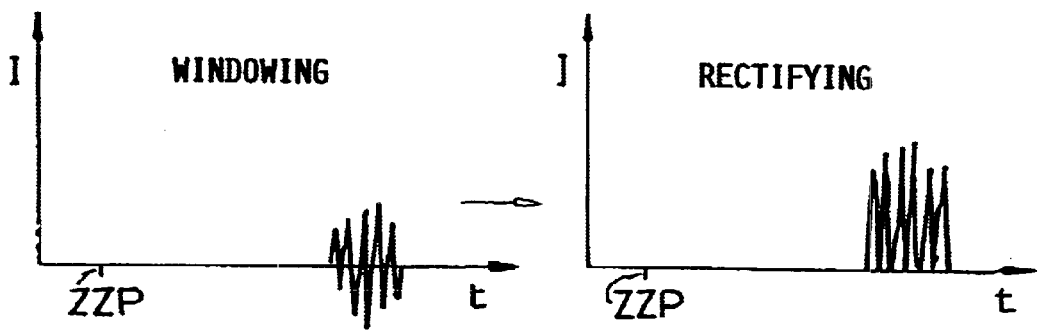
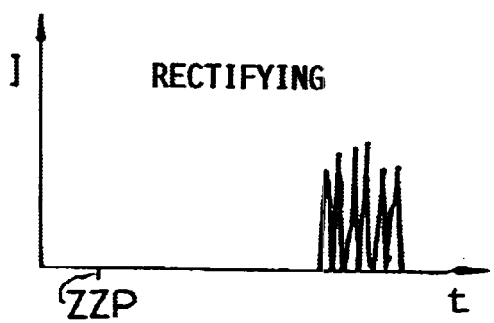
FIG. 1C  FIG. 1D
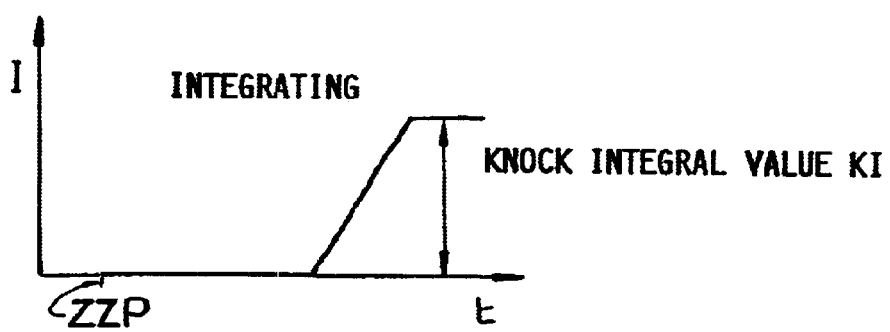
FIG. 1E

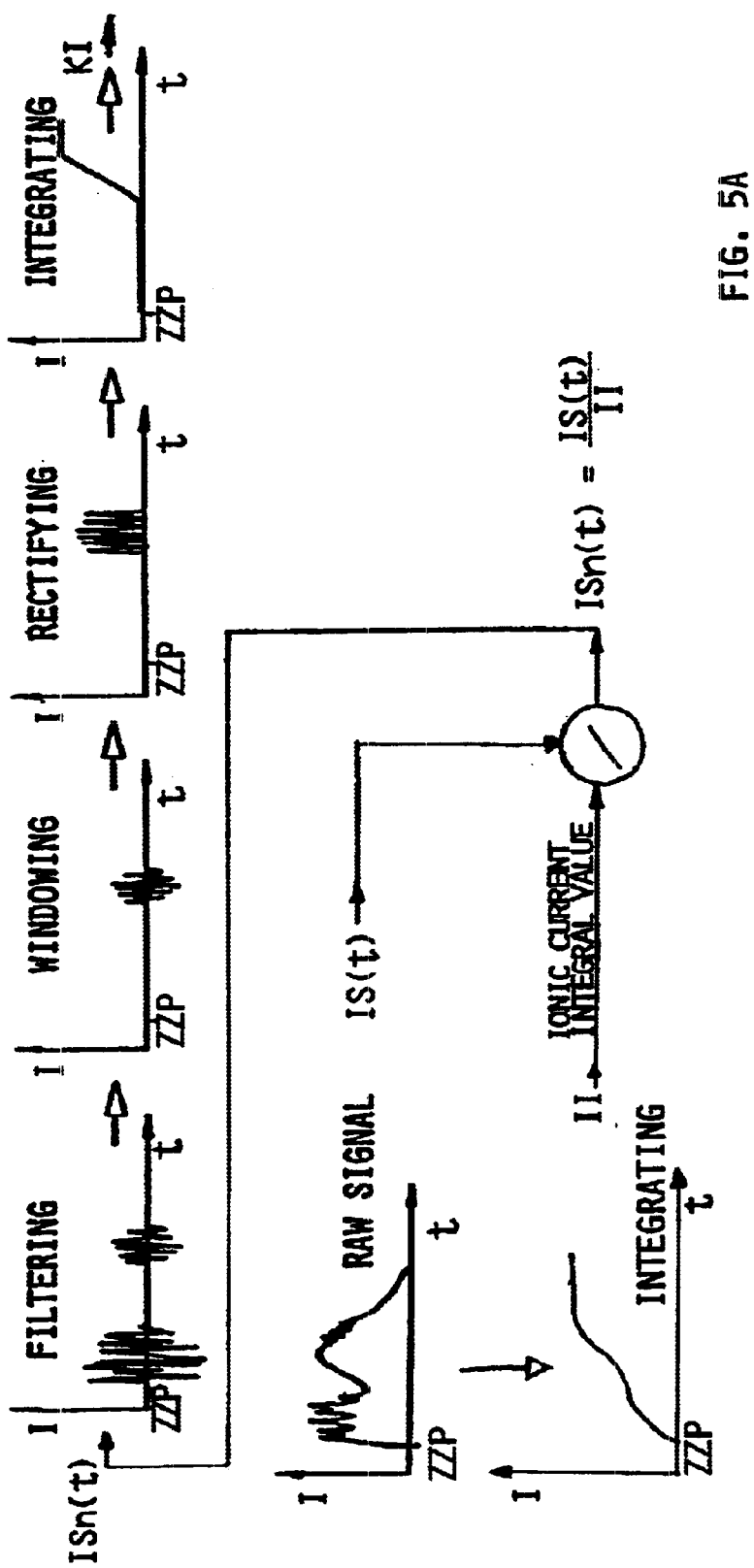

CALCULATION OF SLIDING AVERAGE $\overline{II}_{NEW}$

PREVIOUS IONIC CURRENT INTEGRAL VALUE $\overline{II}_{OLD}$

PRESENT IONIC CURRENT INTEGRAL VALUE $II$

CALCULATION OF SLIDING AVERAGE $\overline{IM}_{NEW}$

PREVIOUS IONIC CURRENT AMPLITUDE VALUE $\overline{IM}_{OLD}$

PRESENT IONIC CURRENT AMPLITUDE VALUE $IM$

METHOD FOR DETECTING KNOCKING COMBUSTION IN THE OPERATION OF AN INTERNAL COMBUSTION ENGINE

FIELD OF THE INVENTION

The present invention relates to a method for detecting knocking combustion in the operation of an internal combustion engine.

BACKGROUND INFORMATION

In the case of externally ignited internal combustion engines, the air/fuel mixture is already ignited during the compression stroke, before the upper dead center, because of the finite propagation speed of the combustion. The optimal ignition point is thereby determined as a function of the crankshaft speed. Knocking combustion occurs as a result of premature ignition, in which excessive pressure peaks lead to an increase in the temperature of the unburned air/fuel mixture and thus to local self-ignitions of the air/fuel mixture. These excessively high pressure peaks in the combustion chambers occur as a rule during full load operation of the internal combustion engine.

In order to determine the knocking combustion, the course of the combustion chamber pressure is recorded by measuring the ionic current in all combustion chambers of the internal combustion engine. A method for measuring the ionic current is known, for example, from DE 33 27 766 A1. In which knocking combustion is detectable by the occurrence of pressure peaks and oscillations in the course of the combustion chamber pressure. To do this, an alternating voltage is fed to the spark plug, which simultaneously acts as an ionic current probe, immediately after the ignition of the air/fuel mixture via the ignition coil. This alternating voltage is modulated by ions in the burning air/fuel mixture as a function of the combustion chamber pressure. The modulated alternating voltage, the raw ionic current signal, is fed to an evaluation circuit.

The ionic current cannot be measured during the ignition of the air/fuel mixture by the spark plug. A method is described in DE 197 20 535 A1 in which the spark duration of the spark plug is reduced to a minimum in order to record the course of the combustion chamber pressure directly afterwards and to detect any knocking combustion.

DE 197 20 532 C2 discloses that, for the evaluation, the raw ionic current signal first has to be filtered through a bandpass filter. Then the part of the filtered signal not caused by knocking is masked by windowing. The remaining signal portions are rectified and then integrated. The resulting knock integral value is proportional to the intensity of the pressure peaks in the course of the combustion chamber pressure.

If knocking combustion is detected in an internal combustion engine, the ignition point for the coming work stroke is shifted within the compression stroke nearer to the upper dead center. Nevertheless, internal combustion engines develop their maximum power with light knocking, whereas with heavier knocking there is a danger of damage occurring to the internal combustion engine with the passage of time. It is thus necessary to specify a threshold value for the knocking integral value, up to which the internal combustion engine can be operated with light knocking, and from which the ignition point must be shifted towards the upper dead center.

The problem with the evaluation of an ionic current signal lies in the large fluctuations in the intensity which occur during the measurement of the ionic current signal from work stroke to work stroke.

Such fluctuations in intensity can have the effect that measured raw ionic current signals with low intensity, which have large pressure peaks and oscillations caused by knocking, give such low knock integral values that they remain below the threshold value for the knock integral, and the ignition point is thus not shifted towards the upper dead center.

Similarly, measured raw ionic current signals with high intensity, which have low pressure peaks and oscillations caused by knocking, give such high knock integral values that they lie above the threshold value for the knock integral, and the ignition point is thus shifted towards the upper dead center, as a result of which the internal combustion engine does not develop its maximum power.

In the basic background publication DE 42 32 845 C2, it is recommended to form an average value in order to improve the assessment of the knock integral value, in which knock integral values are summed and the sum is then divided by the number of the integral values.

The disadvantage of this procedure is that whereas the knock integral values can be better assessed, the fluctuations in the intensity of the raw ionic current signal are still contained in the average value of the knock integral values.

SUMMARY OF THE INVENTION

The object of the invention is to specify a method for detecting knocking combustion during the operation of an internal combustion engine which guarantees a reliable assessment of the knock integral value and which compensates for fluctuations in the intensity of the raw ionic current signal.

The above object is achieved according to the invention in a method for detecting knocking combustion during the operation of an internal combustion engine, by obtaining a raw ionic current signal with an ionic current probe during a combustion stroke in a combustion chamber of the engine, and then evaluating the raw ionic current signal to determine a knocking intensity. Particularly according to the invention, fluctuations in the intensity of the raw ionic current signal are compensated for in the assessment of a knock integral value by normalizing the raw ionic current signal or the value of the knocking intensity The chronological course of the raw ionic current signal is composed first of the ignition faults, then of a first maximum of the combustion, and then of a second maximum of the ionic current which is proportional to the pressure and temperature of the combustion chamber.

To perform the normalization, an ionic current amplitude value, that is the maximum value of the second maximum of the raw ionic current signal, or an ionic current integral value, that is the value of the integrated raw ionic current signal, is determined currently from the raw ionic current signal after each combustion stroke.

Furthermore, to perform the normalization while taking average values into consideration, the quotient is formed from averaged ionic current amplitude values of the previous combustion strokes and a current ionic current amplitude value, or the quotient is formed from averaged ionic current integral values of the previous combustion strokes and a current ionic current integral value.

As normalization for the assessment of the knock integral value, the raw ionic current signal or the value of the knocking intensity is divided by the ionic current amplitude value.

Alternatively, as normalization for the assessment of the knock integral value, the raw ionic current signal or the value of the knocking intensity can be divided by the ionic current integral value.

Two additional normalizations for the assessment of the knock integral value consist of forming the quotient from the averaged ionic current amplitude value and the ionic current amplitude value multiplied by the raw ionic current signal or multiplied by the value of the knocking intensity.

Two additional alternative normalizations for the assessment of the knock integral value consist of forming the quotient from the averaged ionic current integral value and the ionic current integral value multiplied by the raw ionic current signal or multiplied by the value of the knocking intensity.

The raw ionic current signal is evaluated, at least in the process steps:

Filtering, as a result of which only the oscillations of the knocking or the ignition remain as a signal from the raw ionic current signal.

Windowing, as a result of which only the oscillations of the knocking remain as a signal.

Rectification, as a result of which negative signal values are avoided. Integration, as a result of which the knocking intensity value is formed.

In a development of the invention, it is intended to use the spark plugs of the internal combustion engine as ionic current probes.

In a further development of the invention, it is intended that the averaging of the ionic current amplitude value or of the ionic current integral value is performed as a sliding average.

To form the sliding average, the average of the ionic current amplitude or of the ionic current integral of the previous combustion strokes is subtracted from the current ionic current amplitude value or from the current ionic current integral value, this difference is multiplied by a weighting factor, and this product is then added to the average value of the ionic current amplitude or to the ionic current integral of the previous combustion strokes.

A reliable assessment of the knock integral value is provided by the method according to the invention for detecting knocking combustion during the operation of an internal combustion engine, as a result of which it is possible to operate an internal combustion engine at its maximum power.

The method for detecting knocking combustion during the operation of an internal combustion engine, in which fluctuations in the intensity of the raw ionic current signal are compensated by normalization of the raw ionic current signal or the value of the knocking intensity, is shown and explained in the following by means of embodiments and illustrated by two figures.

BRIEF DESCRIPTION OF THE DRAWINGS

The invention will now be described in connection with preferred example embodiments, with reference to the accompanying drawings, wherein:

FIG. 1 including FIGS. 1A to 1E shows a series of diagrams schematically representing various process stages for evaluating a raw ionic current signal, in which the raw ionic current signal is normalized, with FIG. 1A showing the raw signal, FIG. 1B showing filtering, FIG. 1C showing windowing, FIG. 1D showing rectifying, and FIG. 1E showing integrating the signal;

FIG. 5A is a schematic block logic diagram representing a process for normalizing the raw ionic current signal by dividing it by the present ionic current integral value;

DESCRIPTION OF THE PREFERRED EMBODIMENTS

Figure 2A:
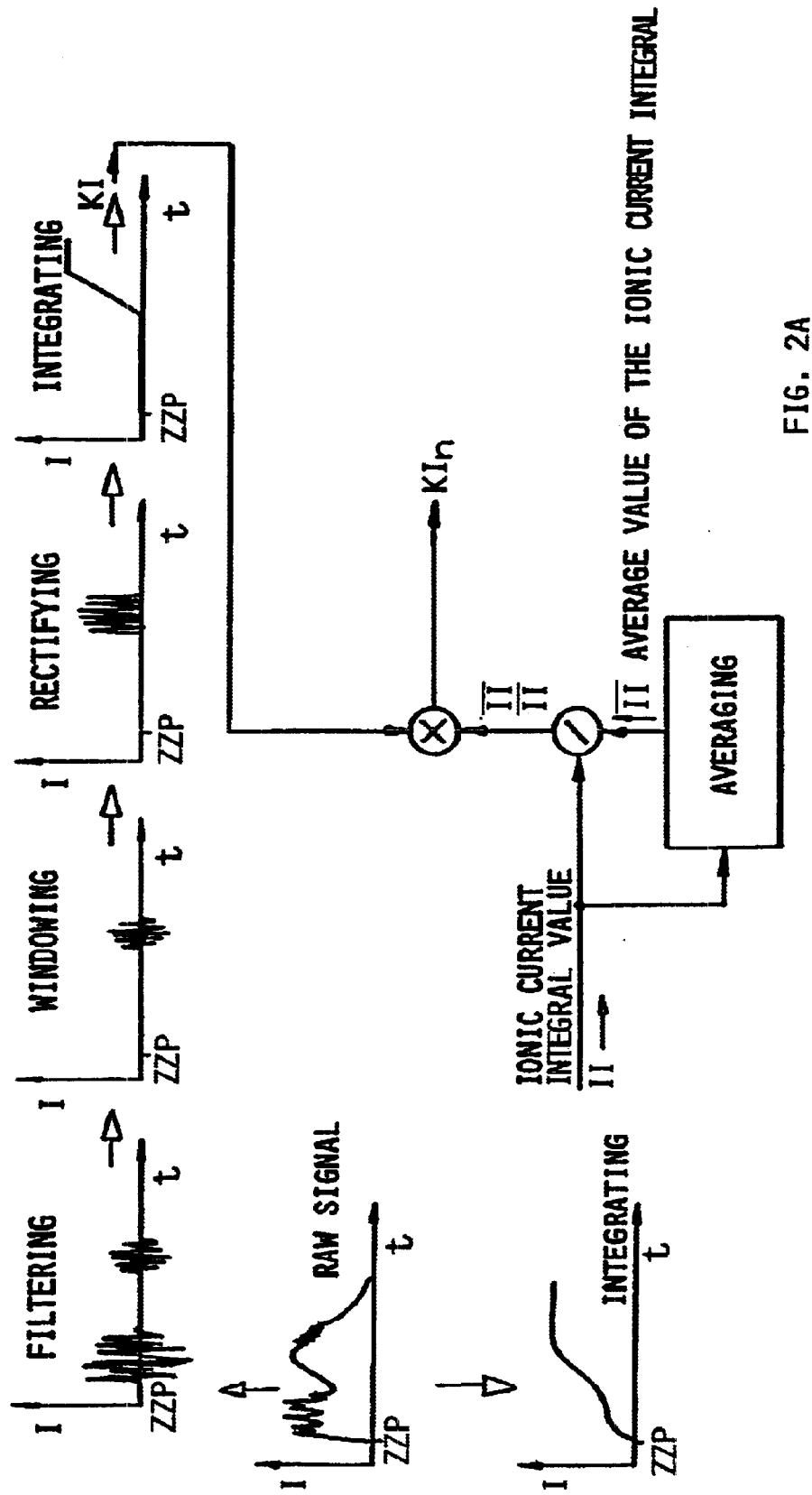
FIG. 2A is a schematic block logic diagram representing a process of normalizing the knock integral value by multiplying it by a quotient of the average value of the ionic current integral and the present ionic current integral value.

FIG. 1 includes a series of diagrams in FIGS. 1A, 1B, 1C, 1D and 1E which show the course of the evaluation of the raw ionic current signal IS(t). The objective of the evaluation is to state a value, the knock integral value KI, which is proportional to the knocking intensity.

The first diagram in FIG. 1A shows the raw ionic current signal IS(t) from the ignition point ZZP as it is sensed by the spark plugs serving as ionic current probes in the combustion chambers of an internal combustion engine.

The raw ionic current signal IS(t) consists of a plurality of signal portions. Starting from the ignition point, signal portions are measured which are generally referred to as ignition faults F, and which have no significance for the evaluation. After that, a first maximum M1 is measured, which can be attributed to the combustion process. A second maximum M2 is then measured which is proportional to the pressure and temperature of the combustion. Knocking combustion expresses itself in the form of peaks of intensity K on the falling flank after the second maximum M2 of the ionic current signal.

The second diagram in FIG. 1B shows the raw ionic current signal IS(t) after it has been filtered by means of band filters, for example a high pass. Here, d.c. voltage components are removed from the signal form, after which the filtered signal form only shows the oscillations of the combustion rocess and the knocking signal.

The third diagram in FIG. 1C shows the filtered signal form after the windowing, which masks the oscillations of the combustion process, and as a result of which the signal form only shows the oscillations of the knocking signal.

The fourth diagram in FIG. 1D shows the oscillation of the knockin signal after the signal form has been rectified.

The fifth diagram in FIG. 1E shows the rectified form of the oscillation of the knocking signal after it has been integrated. The value of the integration, the knock integral value KI, is a measure of the intensity of the knocking.

The investigation of combustion sequences has shown that an internal combustion engine develops its maximum power in full load operation in which low intensity knocking occurs.

Whereas this low intensity knocking does not damage the internal combustion engine in the long-term, high intensity knocking can lead to mechanical damage. It is therefore necessary to specify a threshold value for the assessment of the knock integral value up to which knocking is permitted in the internal combustion engine at full load operation without the ignition point being shifted towards the upper dead center.

Because of the chaotic nature of the combustion of the air/fuel mixture, the intensity of the form of the raw ionic current signal IS(t) and thus also the knock integral value KI vary from one combustion process of a cylinder to the next. Either the raw ionic current signal IS(t) or the knock integral value KI can be normalized to avoid errors in the assessment of the knock integral value KI in comparison to the threshold value.

Optionally, either the ionic current integral value II or the ionic current amplitude IM from the second maximum of the raw ionic current signal IS(t) is specified for the performance of the normalization.

Figure 5B:
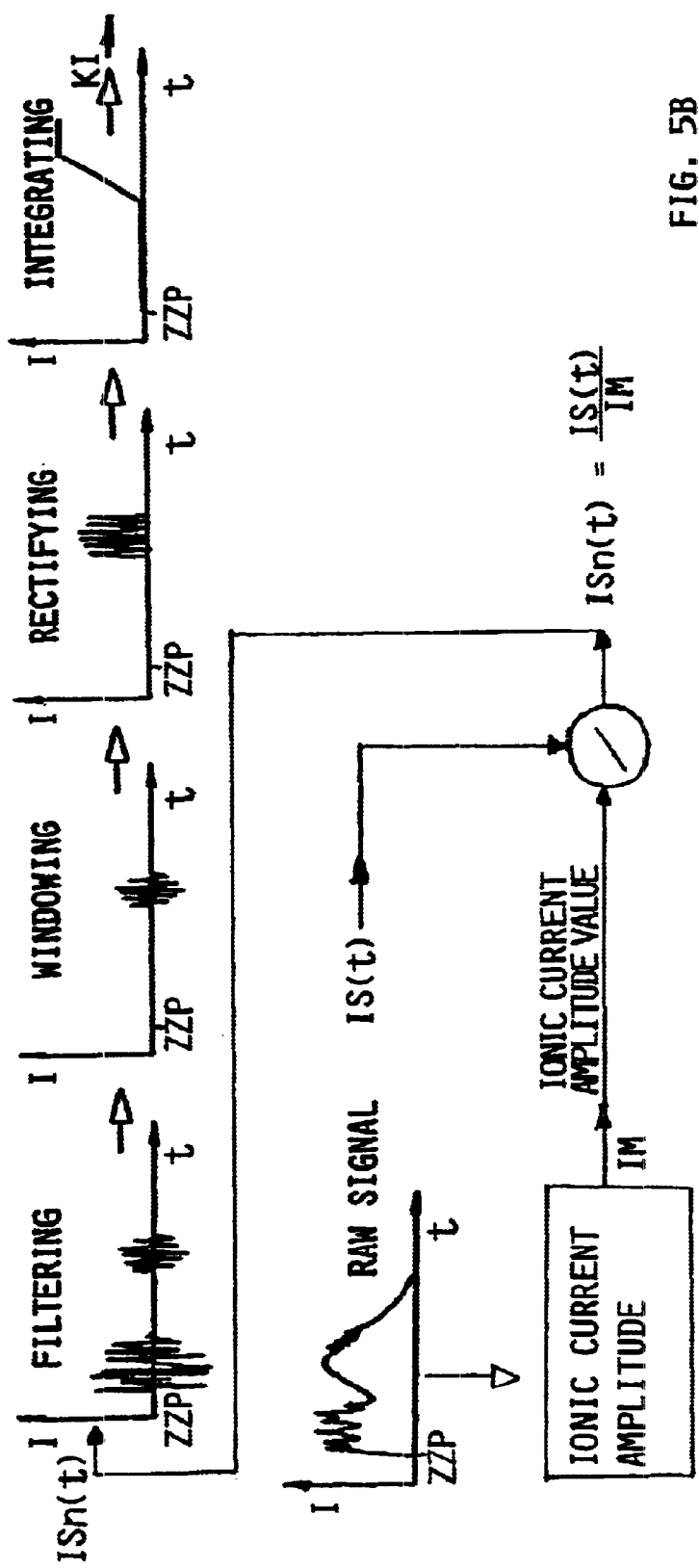
FIG. 5B is a schematic block logic diagram representing a process for normalizing the raw ionic current signal by dividing it by the present ionic current amplitude value.

The normalized raw ionic current signal ISn(t) can be formed optionally through the following operations as shown in FIGS. 5A and 5B:

$$ISn(t) = \frac{IS(t)}{II} \quad\quad 1.1.$$

$$ISn(t) = \frac{IS(t)}{IM} \quad\quad 1.2.$$

Figure 4A:
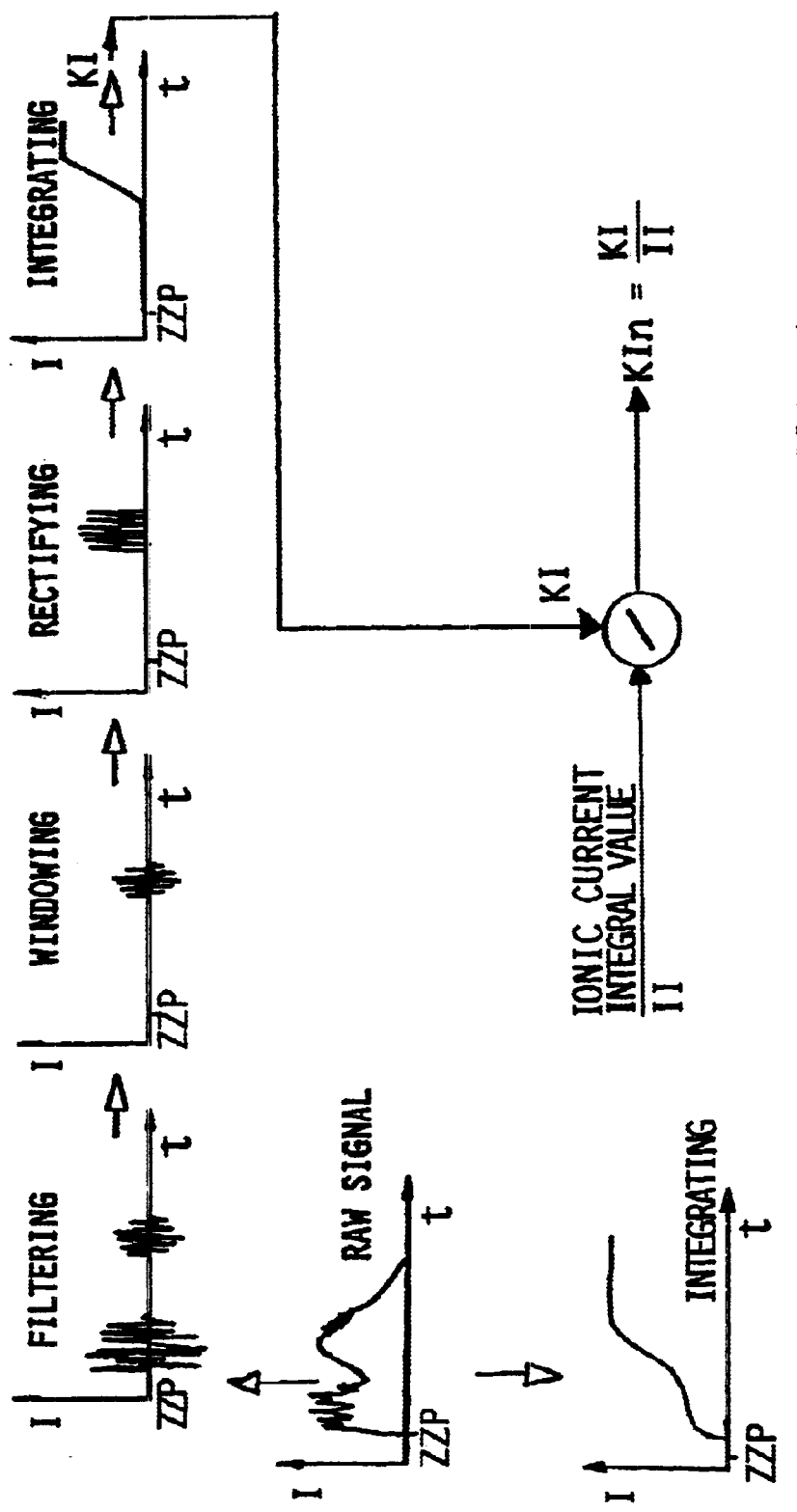
FIG. 4A is a schematic block logic diagram representing a process for normalizing the knock integral value by dividing it by the present ionic current integral value.
Figure 4B:
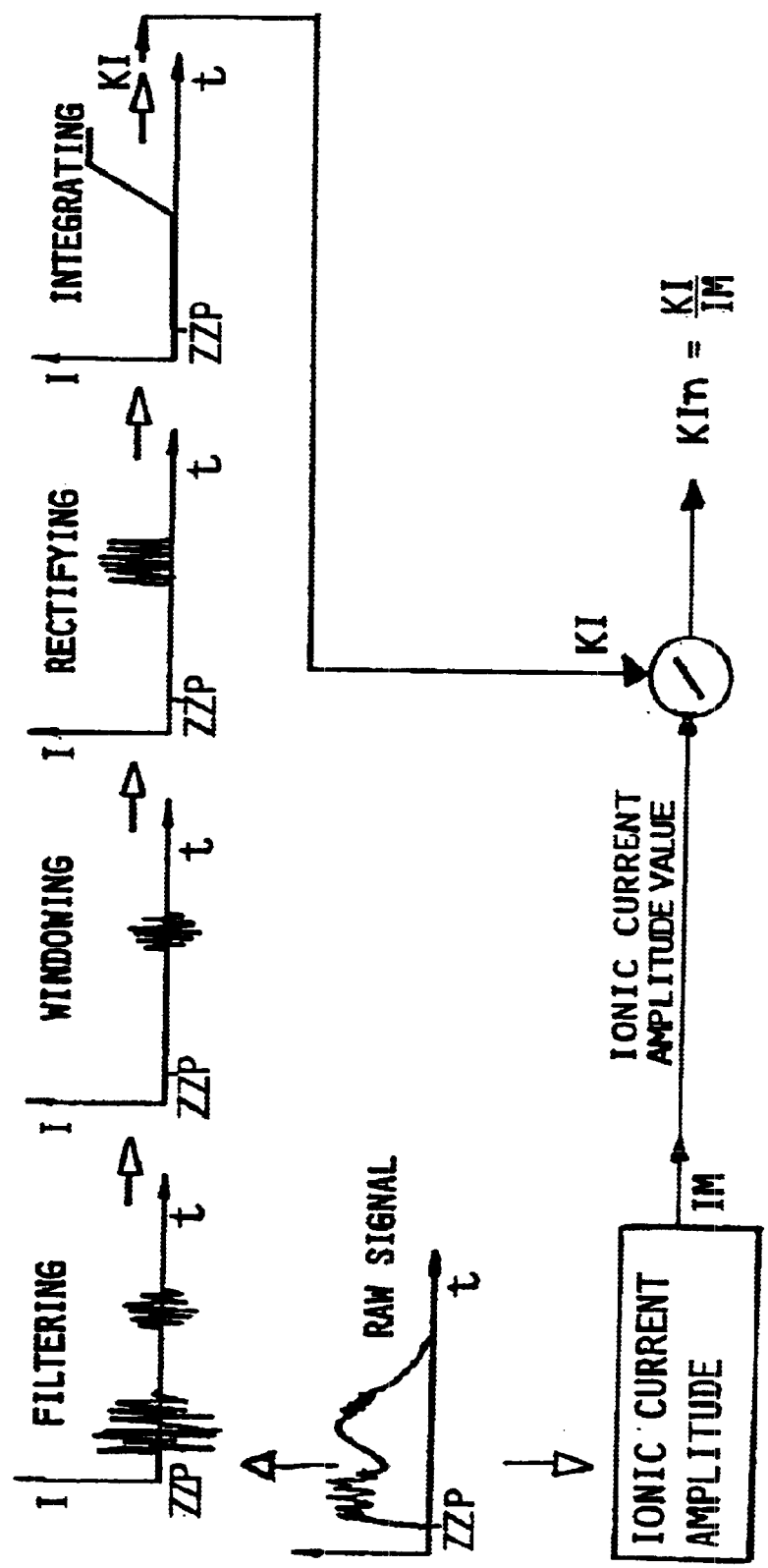
FIG. 4B is a schematic block logic diagram representing a process for normalizing the knock integral value by dividing it by the present ionic current amplitude value.

The normalized knock integral value KIn can be formed optionally through the following operations as shown in FIGS. 4A and 4B:

$$KIn = \frac{KI}{II} \quad\quad 2.1.$$

$$KIn = \frac{KI}{IM} \quad\quad 2.2.$$

Figure 2B:
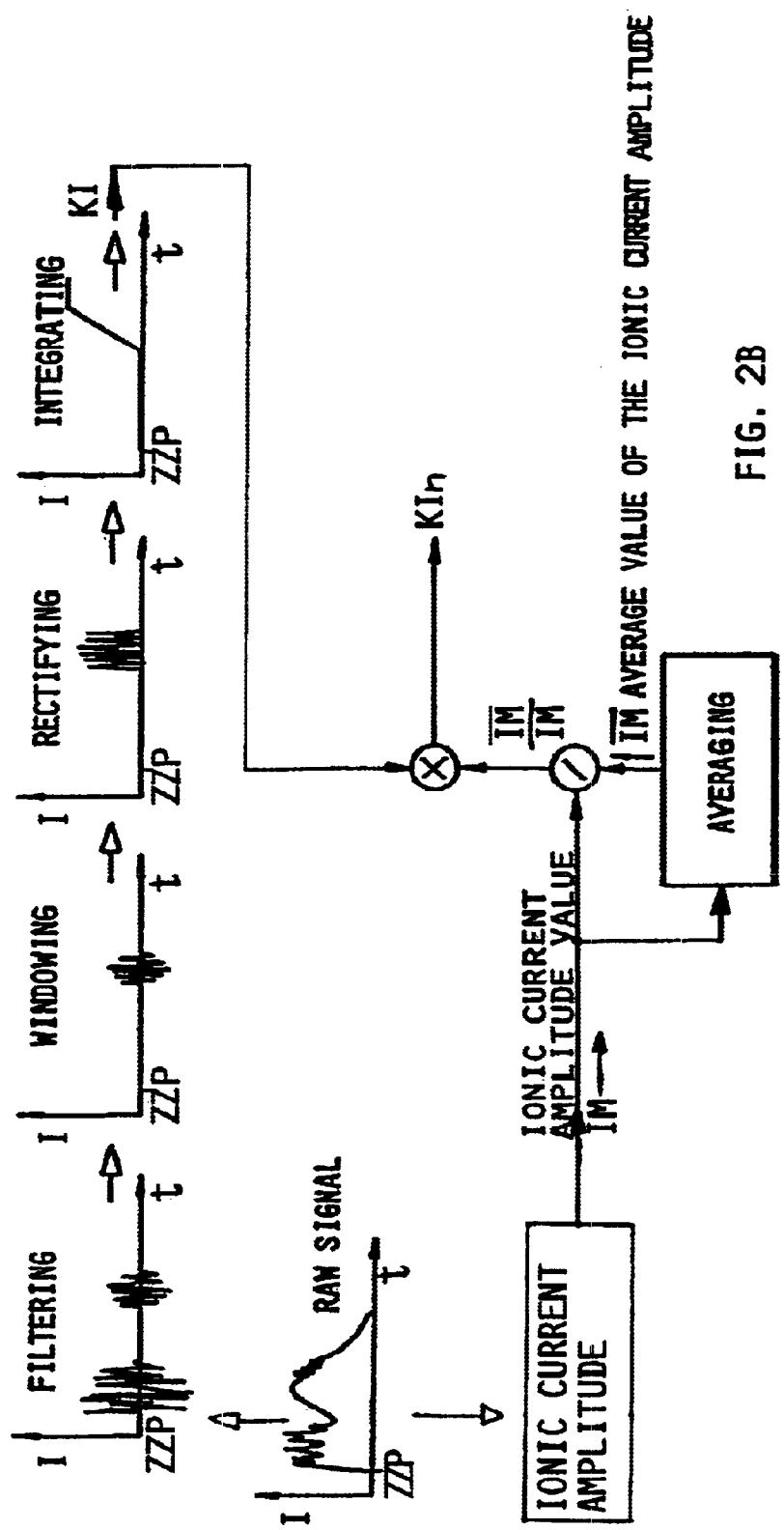
FIG. 2B is a schematic block logic diagram representing a process for normalizing the knock integral value by multiplying it by a quotient of the average value of the ionic current amplitude and the present ionic current amplitude value.
Figure 3A:
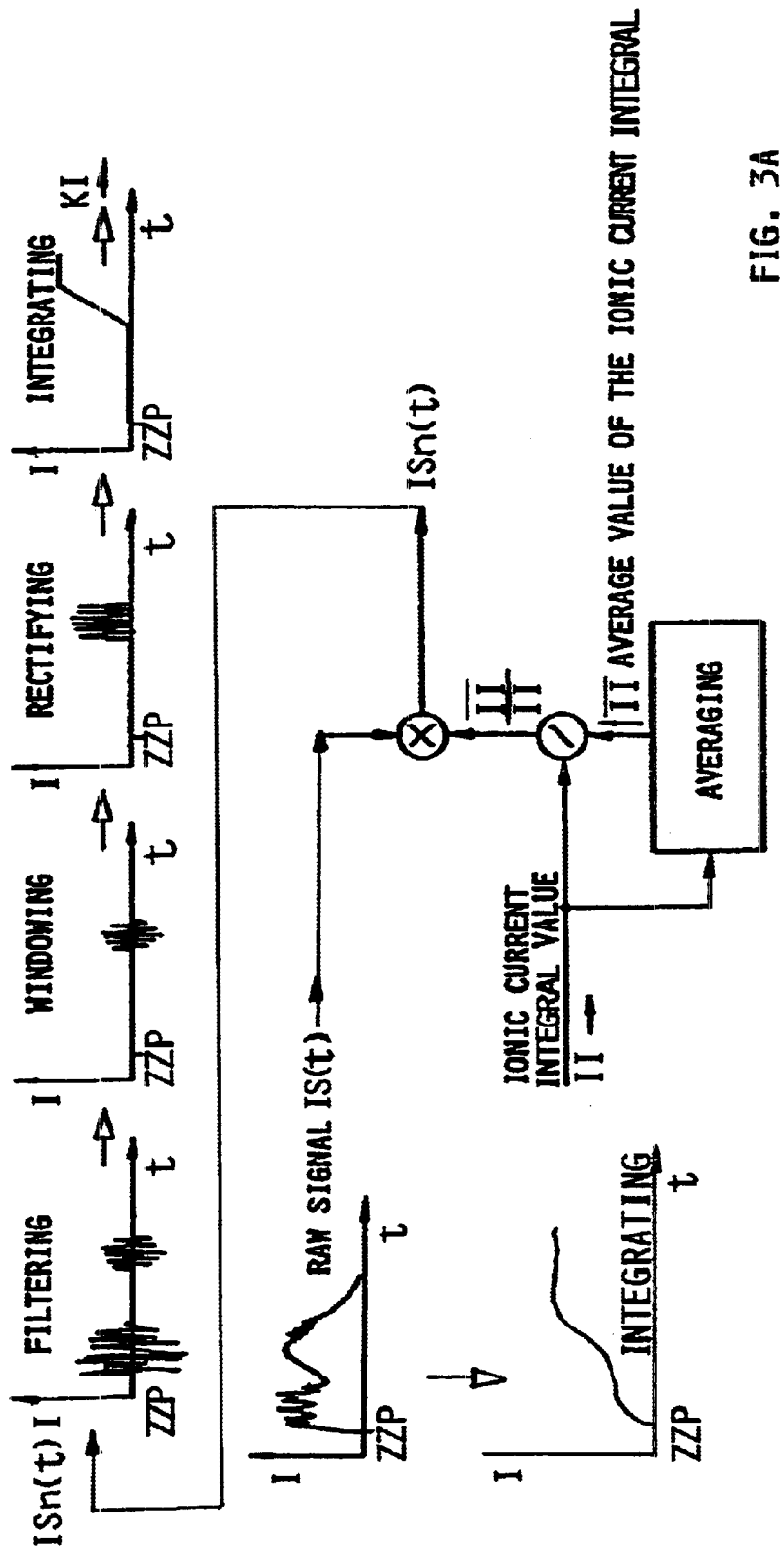
FIG. 3A is a schematic block logic diagram representing a process for normalizing the raw ionic current signal by multiplying it by a quotient of the average value of the ionic current integral and the present ionic current integral value.
Figure 3B:
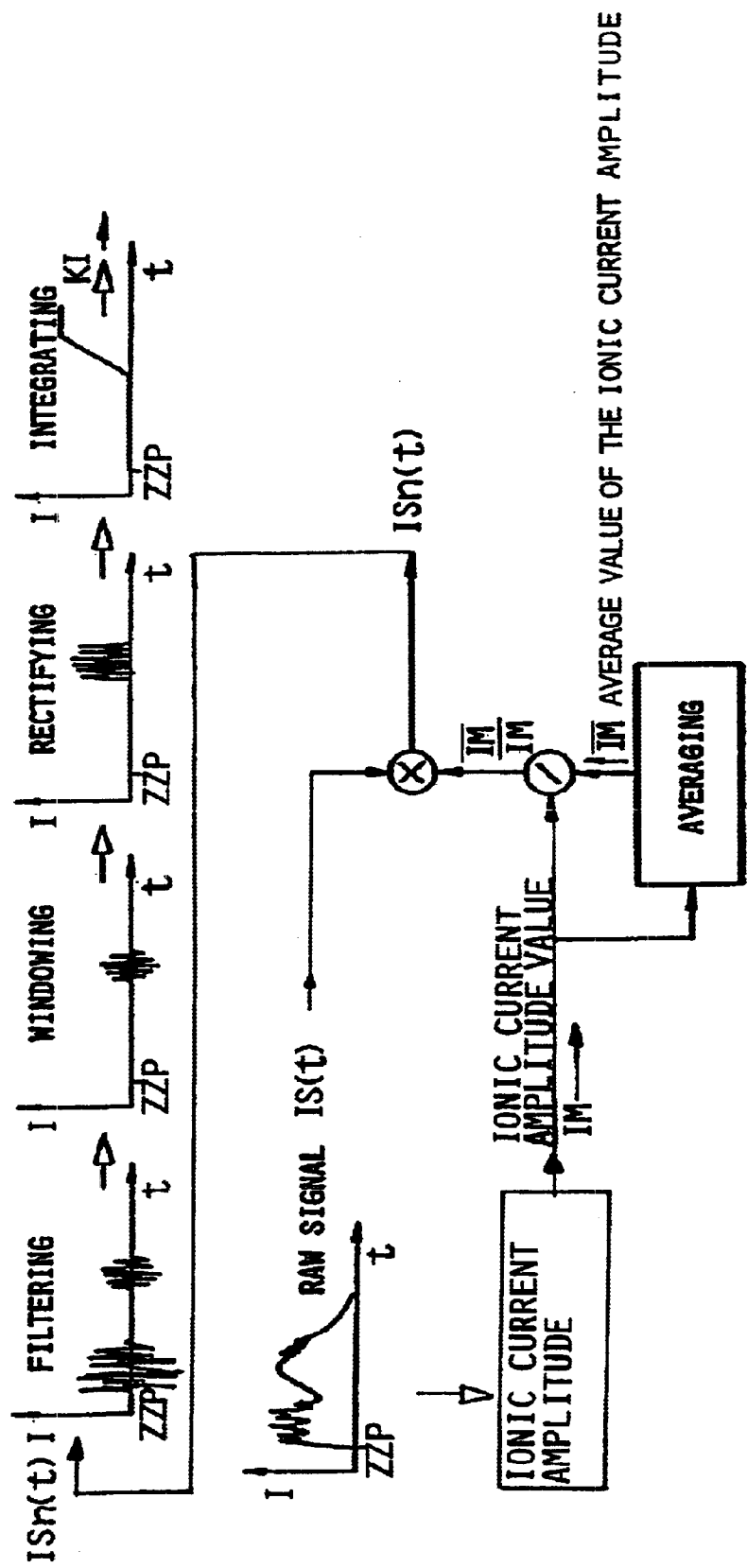
FIG. 3B is a schematic block logic diagram representing a process for normalizing the raw ionic current signal by multiplying it by a quotient of the average value of the ionic current amplitude and the present ionic current amplitude value.
Figure 6A:
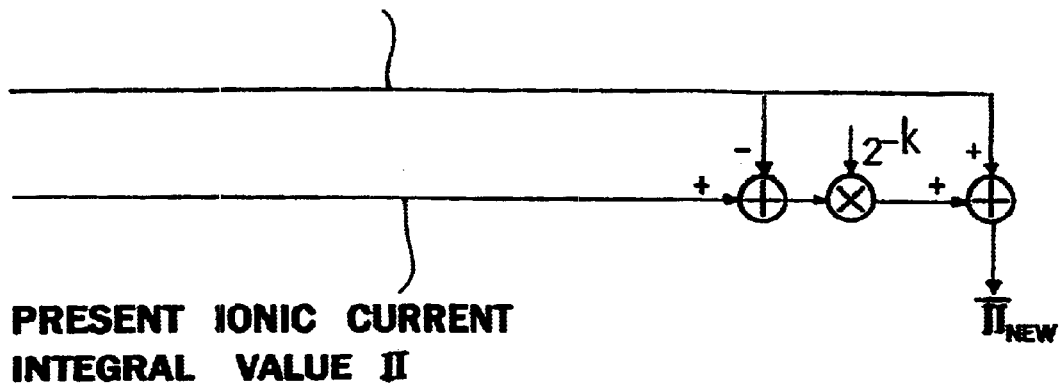
FIG. 6A is a schematic block logic diagram representing the calculation of the sliding average of the new ionic current integral value.
Figure 6B:
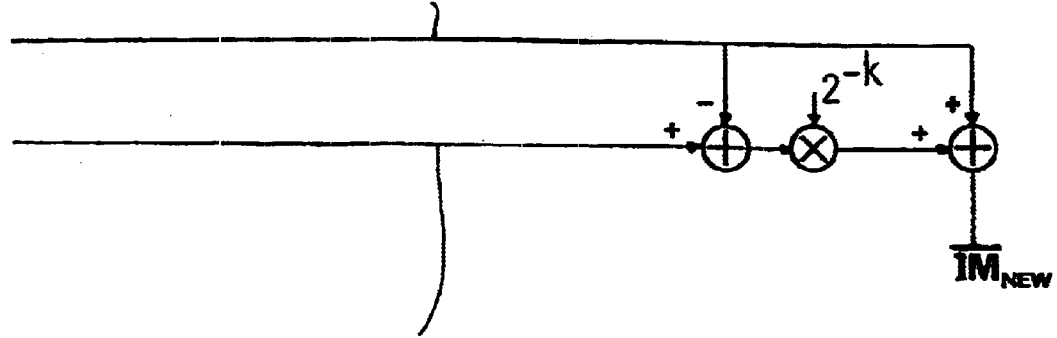
FIG. 6B is a schematic block logic diagram representing the calculation of the sliding average of the new ionic current amplitude value.

Through operations 1.1 to 2.2, which are shown respectively in sequence in FIG. 5A, FIG. 5B, FIG. 4A and FIG. 4B, the present raw ionic current signal IS(t) or the present knock integral value KI is normalized in each case. The ionic current amplitude IM or the ionic current integral II can be averaged if previous raw ionic current signals IS(t) or previous knock integral values KI are also to be taken into consideration in the normalization of the raw ionic current signal IS(t) as shown in FIGS. 3A and 3B, or the normalization of the knock integral value KI as shown in FIGS. 2A and 2B. This averaging can be advantageously performed as sliding averaging as represented in FIGS. 6A and 6B.

In the case of sliding averaging, the average value of the ionic current amplitude $\overline{IM}$ of the previous combustion strokes (FIG. 6B) or the average value of the ionic current integral $\overline{II}$ of the previous combustion strokes (FIG. 6A) is subtracted from the present ionic current amplitude value IM or from the present ionic current integral value II to form a difference, this difference is multiplied by two raised to the power of minus a weighting factor k to form a product, and then this product is added to the average value of the ionic current amplitude $\overline{IM}$ or the ionic current integral $\overline{II}$ of the previous combustion strokes. The weighting factor k is a measure of how quickly the average value to be formed follows currently determined values, and how many previous combustion cycles are to be taken into consideration.

The normalized raw ionic current signal ISn(t), in which the previous raw ionic current signals IS(t) are taken into consideration, can be formed optionally through the following operations as shown in FIGS. 3A arid 3B:

$$ISn(t) = \frac{IS(t)}{II} * \overline{II} \quad\quad 3.1.$$

$$ISn(t) = \frac{IS(t)}{IM} * \overline{IM} \quad\quad 3.2.$$

The normalized knock integral value KIn, in which the previous knock integral values KI are taken into consideration, can be formed optionally through the following operations as shown in FIGS. 2A and 2B:

$$KIn = \frac{KI}{II} * \overline{II} \quad\quad 4.1.$$

$$KIn = \frac{KI}{IM} * \overline{IM} \quad\quad 4.2.$$

As an example, FIG. 2A shows the block logic diagram for forming the normalized knock integral value Kin from the knock integral value KI taking the deviation of the ionic current integral II from the average value of the ionic current integral $\overline{II}$ into consideration.

The normalized raw ionic current signal ISn(t) or the normalized knock integral value KIn enable the internal combustion engine, on account of the reliable assessment of the knock integral value KI in comparison to the threshold value, to develop its maximum power in full load operation without the fear of damage to the internal combustion engine through too severe knocking.

What is claimed is:

1. Method for detecting knocking combustion during operation of an internal combustion engine, in which a raw ionic current signal (IS(t)) is measured by an ionic current probe during a combustion stroke in combustion chambers of the internal combustion engine, from which a value of a knocking intensity (KI) is evaluated, wherein fluctuations in an intensity of the raw ionic current signal (IS(t)) are compensated for by performing a normalization of the raw ionic current signal (IS(t)) or the value of the knocking intensity (KI), wherein the chronological form of the raw ionic current signal (IS(t)) is composed first of ignition faults, then of a first maximum of the combustion, and then of a second maximum of the raw ionic current signal, and wherein an ionic current amplitude value (IM), that is the maximum value of the second maximum of the raw ionic current signal (IS(t)), or an ionic current integral value (II), that is the value of an integration of the raw ionic current signal (IS(t)), is currently determined for performing the normalization after each combustion stroke.

2. Method according to claim 1, wherein, for performing the normalization, the quotient is formed from averaged ionic current amplitude values ($\overline{IM}$) of the previous combustion strokes and a present ionic current amplitude value (IM), or the quotient is formed from averaged ionic current integral values ($\overline{II}$) of the previous combustion strokes and a present ionic current integral value (II).

3. Method according to claim 1, wherein, as normalization, the raw ionic current signal (IS(t)) or the value of the knocking intensity (KI) is divided by the ionic current amplitude value (IM).

4. Method according to claim 1 wherein, as normalization, the raw ionic current signal (IS(t)) or the value of the knocking intensity (KI) is divided by the ionic current integral value (II).

5. Method according to claim 2 wherein, as normalization, the quotient from the averaged ionic current amplitude values ($\overline{IM}$) and the ionic current amplitude value (IM) is multiplied by the raw ionic current signal (IS(t)) or the value of the knocking intensity (KI).

6. Method according to claim 2 wherein, as normalization, the quotient from the averaged ionic current integral values ($\overline{II}$) and the ionic current integral value (II) is multiplied by the raw ionic current signal (IS(t)) or the value of the knocking intensity (KI).

7. Method according to claim 1 wherein the raw ionic current signal (IS(t)) is filtered, windowed, rectified and integrated to provide the value of the knocking intensity, in the form of a knock integral value (KI), for evaluation.

8. Method according to claim 1 wherein the internal combustion engine has spark plugs, which are respectively used as the ionic current probe.

9. Method according to claim 2 wherein the averaging of the ionic current amplitude value (IM) or the ionic current integral value (II) is performed as a sliding averaging.

10. Method according to claim 9 wherein the averaged ionic current amplitude values ($\overline{IM}$) or the averaged ionic current integral values ($\overline{II}$) of the previous combustion strokes are subtracted from the present ionic current amplitude value (IM) or from the present ionic current integral value (II) to form a first difference, the first difference is multiplied by a weighting factor (k) to form a first product, and the first product is then added to the averaged ionic current amplitude values ($\overline{IM}$) or to the averaged ionic current integral values ($\overline{II}$) of the previous combustion strokes to form the sliding average.

11. A method of detecting knocking combustion in an internal combustion engine having at least one combustion chamber operating in a succession of combustion cycles, comprising the following steps carried out for a respective present combustion cycle of said succession of said combustion cycles:
  a) sensing an ionic current in said combustion chamber during a combustion stroke of said present combustion cycle, and providing a raw ionic current signal corresponding to said ionic current, wherein said raw ionic current signal has a chronological form comprising a first signal portion corresponding to ignition faults during said combustion stroke, a second signal portion corresponding to a first maximum of combustion during said combustion stroke, and a third signal portion corresponding to a second maximum of said ionic current, and wherein said raw ionic current signal of said present combustion cycle exhibits an intensity fluctuation relative to respective previous raw ionic current signals of previous combustion cycles of said succession of combustion cycles; and
  b) carrying out one of:
    a step b1) of evaluating said raw ionic current signal to determine therefrom a value of a knocking intensity and then normalizing said value of said knocking intensity to provide a normalized value of said knocking intensity, or
    a step b2) of normalizing said raw ionic current signal to provide a normalized ionic current signal and then evaluating said normalized ionic current signal to determine therefrom a normalized value of a knocking intensity;
    wherein said normalizing includes substeps of determining a normalization factor and using said normalization factor to normalize said raw ionic current signal or said value of said knocking intensity for said present combustion cycle, and
    wherein said normalization factor is an ionic current amplitude value that corresponds to a maximum value of said second maximum in said raw ionic current signal of said present combustion cycle, or said normalization factor is an ionic current integral value that corresponds to a value of an integration of said raw ionic current signal of said present combustion cycle.

12. The method according to claim 11, wherein said step b) comprising carrying out said step b1), and wherein said normalization factor is said ionic current amplitude value.

13. The method according to claim 12, wherein said normalizing comprises dividing said value of said knocking intensity by said ionic current amplitude value, to give said normalized value of said knocking intensity.

14. The method according to claim 12, wherein said normalizing comprises obtaining an average amplitude value by averaging respective ones of said ionic current amplitude value of said respective previous raw ionic current signals of said previous combustion cycles, and then dividing said value of said knocking intensity by said ionic current amplitude value and multiplying said value of said knocking intensity by said average amplitude value, to give said normalized value of said knocking intensity.

15. The method according to claim 11, wherein said step b) comprises carrying out said step b1), and wherein said normalization factor is said ionic current integral value.

16. The method according to claim 15, wherein said normalizing comprises dividing said value of said knocking intensity by said ionic current integral value, to give said normalized value of said knocking intensity.

17. The method according to claim 15, wherein said normalizing comprises obtaining an average integral value by averaging respective ones of said ionic current integral value of said respective previous raw ionic current signals of said previous combustion cycles, and then dividing said value of said knocking intensity by said ionic current integral value and multiplying said value of said knocking intensity by said average integral value, to give said normalized value of said knocking intensity.

18. The method according to claim 11, wherein said step b) comprises carrying out said step b2), and wherein said normalization factor is said ionic current amplitude value.

19. The method according to claim 18, wherein said normalizing comprises dividing said raw ionic current signal by said ionic current amplitude value, to give said normalized ionic current signal.

20. The method according to claim 18, wherein said normalizing comprises obtaining an average amplitude value by averaging respective ones of said ionic current amplitude value of said respective previous raw ionic current signals of said previous combustion cycles, and then dividing said raw ionic current signal by said ionic current amplitude value and multiplying said raw ionic current signal by said average amplitude value, to give said normalized ionic current signal.

21. The method according to claim 11, wherein said step b) comprises carrying out said step b2), and wherein said normalization factor is said ionic current integral value.

22. The method according to claim 21, wherein said normalizing comprises dividing said raw ionic current signal by said ionic current integral value, to give said normalized ionic current signal.

23. The method according to claim 21, wherein said normalizing comprises obtaining an average integral value by averaging respective ones of said ionic current integral value of said respective previous raw ionic current signals of said previous combustion cycles, and then dividing said raw ionic current signal by said ionic current integral value and multiplying said raw ionic current signal by said average integral value, to give said normalized ionic current signal.

24. The method according to claim 11, wherein said normalizing further includes obtaining an average amplitude value by averaging respective ones of said ionic current amplitude value of said respective previous raw ionic current signals of said previous combustion cycles or obtaining an average integral value by averaging respective ones of said ionic current integral value of said respective previous raw ionic current signals of said previous combustion cycles, and then forming a first quotient of said average amplitude value and said ionic current amplitude value or forming a second quotient of said average integral value and said ionic current integral value.

25. The method according to claim 24, wherein said normalizing comprises multiplying said raw ionic current signal or said value of said knocking intensity by said first quotient.

26. The method according to claim 24, wherein said normalizing comprises multiplying said raw ionic current signal or said value of said knocking intensity by said second quotient.

27. The method according to claim 24, wherein said averaging is performed as a sliding averaging.

28. The method according to claim 27, wherein said sliding averaging comprises subtracting said average amplitude value or said average integral value of said previous combustion cycles respectively from said ionic current amplitude value or said ionic current integral value of said present combustion cycle to form a difference, multiplying said difference by a weighting value to form a product, and adding said product to said average amplitude value or said average integral value to form a sliding average value.

29. The method according to claim 11, wherein said evaluating comprises filtering, windowing, rectifying, and integrating said raw ionic current signal or said normalized ionic current signal to respectively provide said value or said normalized value of said knocking intensity as a knock integral value.

30. The method according to claim 11, wherein said engine has a spark plug and wherein said step a) comprises using said sparkplug as an ionic current probe for sensing said ionic current.

* * * * *

UNITED STATES PATENT AND TRADEMARK OFFICE
CERTIFICATE OF CORRECTION

PATENT NO.    : 6,655,191 B2
DATED         : December 2, 2003
INVENTOR(S)   : Hohner et al.

It is certified that error appears in the above-identified patent and that said Letters Patent is hereby corrected as shown below:

Title page,
Item [73], Assignee, replace "Nuremburg" with -- Nuremberg --;

Column 4,
Line 67, after "combustion" replace "rocess" by -- process --;

Column 5,
Line 6, after "the", replace "knockin" by -- knocking --;

Column 6,
Line 18, after "3A", replace "arid" by -- and --;
Line 37, after "value", replace "Kin" by -- KIn --.

Signed and Sealed this

Sixth Day of April, 2004

JON W. DUDAS
*Acting Director of the United States Patent and Trademark Office*